United States Patent
Qiu et al.

(10) Patent No.: US 8,068,233 B2
(45) Date of Patent: Nov. 29, 2011

(54) COMPACT RESONATOR FIBER OPTIC GYROSCOPES

(75) Inventors: Tiequn Qiu, Glendale, AZ (US); Lee Strandjord, Tonka Bay, MN (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 236 days.

(21) Appl. No.: 12/466,140

(22) Filed: May 14, 2009

(65) Prior Publication Data

US 2010/0290057 A1 Nov. 18, 2010

(51) Int. Cl.
*G01B 9/02* (2006.01)
(52) U.S. Cl. ....................................... 356/461
(58) Field of Classification Search .................. 356/459, 356/460, 461, 470
See application file for complete search history.

(56) References Cited

U.S. PATENT DOCUMENTS

| | | | |
|---|---|---|---|
| 3,469,922 A | 9/1969 | Coccoli et al. | |
| 3,772,611 A | 11/1973 | Smith | |
| 4,013,365 A | 3/1977 | Vali et al. | |
| 4,396,290 A | 8/1983 | Morris | |
| 4,473,808 A | 9/1984 | Flierl et al. | |
| 6,108,358 A | 8/2000 | Albers et al. | |
| 7,245,381 B2 | 7/2007 | Marino et al. | |
| 7,327,460 B2 | 2/2008 | Sanders et al. | |
| 7,463,360 B2 * | 12/2008 | Hughes et al. | 356/461 |
| 7,486,401 B2 | 2/2009 | Sanders | |
| 7,522,284 B2 * | 4/2009 | Sanders et al. | 356/461 |
| 7,889,350 B2 * | 2/2011 | Qiu et al. | 356/461 |
| 2007/0242276 A1 * | 10/2007 | Hughes et al. | 356/461 |
| 2008/0079947 A1 * | 4/2008 | Sanders et al. | 356/461 |
| 2008/0159684 A1 | 7/2008 | Sanders et al. | |

* cited by examiner

*Primary Examiner* — Gregory J Toatley
*Assistant Examiner* — Scott M Richey
(74) *Attorney, Agent, or Firm* — Fogg & Powers LLC

(57) ABSTRACT

Substantially symmetric RFOG configurations for rotation rate sensing using two input/output coupling components. Configurations are disclosed where optical coupling components handles both input and output lightwaves. Reducing the number of input/output coupling components while maintaining a substantially symmetric configuration for the CW and CCW beam reduces losses, prevents realization of bias errors due to asymmetric light paths in the resonator, and produces better signal to noise performance. In addition, the invention discloses systems integrating multiple functions into compact micro-optic devices that are easier to fabricate and package, leading to compact RFOGs with reduced cost and improved manufacturability.

19 Claims, 10 Drawing Sheets

COMPACT RESONATOR FIBER OPTIC GYROSCOPES

BACKGROUND OF THE INVENTION

A resonator fiber optic gyroscope (RFOG) is a rotation rate measurement apparatus that uses a fiber ring resonant cavity to enhance a rotation-induced Sagnac effect. The basic principle of RFOG operation is that the effective resonator round-trip path length in a clockwise (CW) and counter-clockwise (CCW) direction is different when the rotation has a nonzero component in a resonator axis. By measuring the CW and CCW resonance frequency difference, which is proportional to Sagnac phase shift due to rotation, the RFOG can accurately measure the rotation rate. Several RFOG configurations are suggested by the prior art. Three specific prior art resonator configurations are shown in FIGS. 1-3.

FIG. 1 shows a resonator in reflection mode configuration, where light is introduced to a resonator formed by a resonator input mirror and a fiber optic resonator coil. The mirror has some reflectivity and a low, but non-zero, transmission coefficient. Thus, most of the light incident on the mirror is reflected, but a portion of the light is transmitted. In operation, light from a laser is introduced to the resonator after being transmitted through the resonator input mirror. Light recirculates within the resonator multiple times by means of the resonator input mirror, i.e. light emerging from one end of the fiber is repeatedly reflected back into the other end. Some of the recirculated light is transmitted out of the resonator (dotted line) to the detector, where the recirculated light is interfered with light that was originally reflected from the light source (solid line toward the detector). These interfering lightwaves from the resonator input mirror are used to measure the resonance signal. Specifically referring to the light propagating in the CW direction of the coil in FIG. 1, a small portion of light from the CW laser enters the resonator at the resonator input mirror. Most of the light from the CW laser is reflected by the resonator input mirror and continues towards the CCW laser. A portion of the light that recirculates within the resonator coil is coupled out of the resonator along the same path as the reflected light. A portion of the reflected light and the resonator output light are redirected by the CW tap mirror to a CW detector. The reflected light and the resonator output light interfere on the CW detector. The interference results in a lightwave having a resonance dip corresponding to zero light. The bottom of the dip occurs when the frequency of the light is at a resonance frequency of the coil. Similarly, light from the CCW laser is introduced into the resonator in the opposite direction and its resonance is detected by the CCW detector.

A problem associated with the architecture shown in FIG. 1 is that large rotation sensing errors are caused by the interference between an undesirable portion of the reflected light and the resonator output light. The undesirable portion of the reflected wave could be slightly different in its spatial-mode or polarization-mode characteristics than that of the resonator output wave. Even after careful alignment, polarization dependent losses or spatial aperturing effects between the resonator input mirror and the detector can cause errors in the rotation rate measurement. For example, imperfections in the input polarization state will result in line-shape asymmetry, which in turn will result in a gyro rate bias error. Accordingly, there is a need to detect the resonance frequency of the resonator without interfering the reflected and resonator output waves.

FIG. 2 shows prior art of a resonator in transmission mode. This resonator architecture overcomes the problem with the previous reflection-mode resonator by placing another mirror within the cavity to tap off a portion of the light recirculating in the coil. Specifically, the light that is reflected by the resonator is removed by an optical isolator placed in front of the opposing laser. Thus, only the light recirculating in the resonator in the CW direction reaches the CW detector, i.e. no interference occurs between the recirculating light and the reflected light. However, this architecture is not symmetric in the CW and CCW directions because only some light in the CW direction propagates through the fiber coil prior to reaching the CW detector, while all of light in the CCW direction propagates through the fiber coil prior to reaching the CW detector. This asymmetry poses a problem. If some light propagating in the CW direction is not in the correct spatial-mode or polarization mode, it can leak through to the CW detector and may be different from the light that is recirculating within the resonator. Thus, detected light could still be mismatched to the resonator output light and reach the detector without first passing through the resonator coil. It is known that this asymmetry combined with polarization and spatial mode imperfections can lead to significant rotation sensing errors. Accordingly, there is a need for a symmetric, transmission mode resonator.

FIG. 3 shows a prior art illustration of a symmetric, transmission mode resonator. This resonator is formed by adding a third mirror to the resonator cavity. This resonator is both in transmission-mode configuration and symmetrical for the CW and CCW light propagation. In this configuration, the light reaching the detector always passes through the resonator coil fiber at least once, thus eliminating the issues discussed for the configurations shown in FIGS. 1 and 2. However, adding a third mirror adds significant complexity to the optics within the resonator cavity. To achieve high performance, the round trip optical loss within the cavity must be very low. Achieving low optical loss in the cavity is far more important than achieving low loss outside the cavity. Specifically, a round trip loss of under 1 dB is usually acceptable within the cavity, and up to three dB of loss is acceptable outside the cavity. The angular alignments of each cavity mirror are critical to achieving low loss in the cavity. Including the third mirror within the cavity increases the difficulty in obtaining a low cavity loss with a low cost device that is capable of being manufactured with a high degree of automation. Additionally, environmental changes may exacerbate the cavity loss because temperature changes can disrupt the alignments of the cavity mirror. Accordingly, there is a need for a simplified, symmetric, transmission mode resonator with only two mirrors.

SUMMARY OF THE INVENTION

The present invention provides for improved compact resonator fiber optic gyroscope systems that are symmetric, in transmission mode, and/or use only two coupling devices (e.g. mirrors, partial reflectors or devices that partially transmit and partially reflect light) within the resonator cavity.

A fiber optic gyro system includes a coil having a first end and a second end and a device in optical communication with the coil. The device is configured to receive light from a source and to also receive light from each end of the coil. A first component of the device is configured to direct at least a portion of light from the source to the first end of the coil so that light propagates through the coil in a first direction. A second component of the device is configured to direct at least a portion of light from the source to the second end of the coil so that light propagates through the coil in a second direction. The first component is also configured to direct at least a portion of light from the first end of the coil to the second component, direct at least a portion of light from the second component to the first end of the coil, and direct at least a portion of light propagating in the second direction to a first detector. The second component is configured to direct at least a portion of light from the second end of the coil to the first component, direct at least a portion of light from the first component to the second end of the coil, and direct at least a portion of light propagating in the first direction to a second detector.

In accordance with further aspects of the invention, the device may also include a third component and a fourth component. The third component is configured to direct light received from the first component to the first detector, direct light from the source to the first component, and prevent light received from the source from entering the first detector without circulating in the coil. The fourth component is configured to direct light received from the second component to the second detector, direct light from the source to the second component, and prevent light received from the source from entering the second detector without first circulating in the coil.

In accordance with other aspects of the invention, the third component is configured to direct at least a portion of the light from the source to a first RIN monitoring component, and the fourth component is further configured to direct at least a portion of the light from the source to a second RIN monitoring component.

In accordance with still further aspects of the invention, the third and fourth component each comprise a directional coupling device.

In accordance with yet other aspects of the invention, the device includes at least one polarizing component.

In accordance with still further aspects of the invention, the single polarizing component is configured to polarize light received from the third component, the fourth component, the first end of the coil, and the second end of the coil.

In accordance with still another aspect of the invention, the device and the coil are configured so that all light directed to the detector has been passed through at least one polarizer and the coil.

In accordance with yet another aspect of the invention, the device includes a first pathway configured to facilitate optical communication in both directions between the first component and the third component, and the device further comprises a second pathway configured to facilitate optical communication in both directions between the second component and the fourth component.

In accordance with further aspects of the invention, the device includes a third pathway configured to facilitate optical communication in both directions between the first component and the second component.

In accordance with still further aspects of the invention, the device and the coil are configured such that light propagating in the first direction and the light propagating in the second direction travel in substantially symmetrical paths.

In accordance with additional aspects of the invention, the first component and the second component include a coupling device configured to transmit and reflect light.

In accordance with yet other aspects of the invention, each coupling device includes a mirror.

In accordance with other aspects of the invention, the first component and the second component include no more than two mirrors total.

In accordance with still other aspects of the invention, the first component, the second component, the third component, and the fourth component are integrated into a single micro-optic device.

In accordance with still further aspects of the invention, the first component and the second component are integrated into a single micro-optic device.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
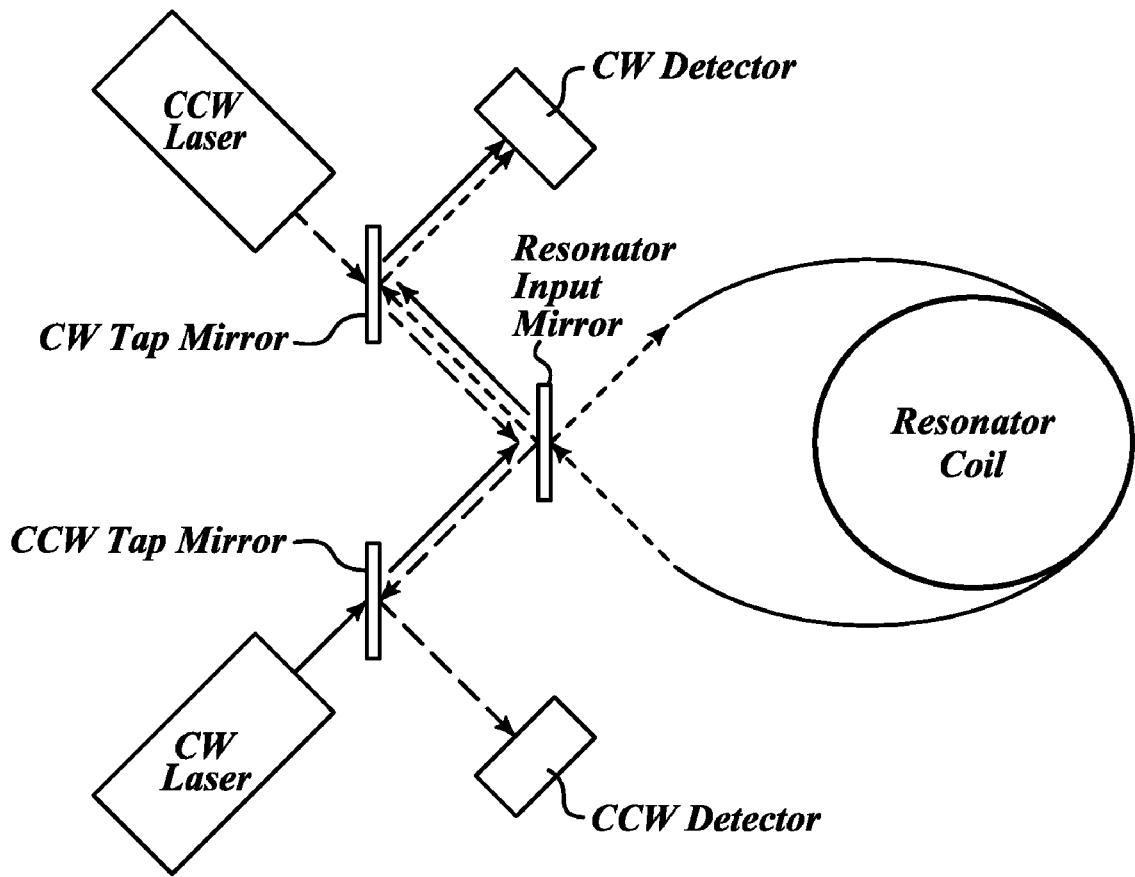
FIG. 1 is a schematic view of a prior art RFOG resonator in reflection mode.
Figure 2:
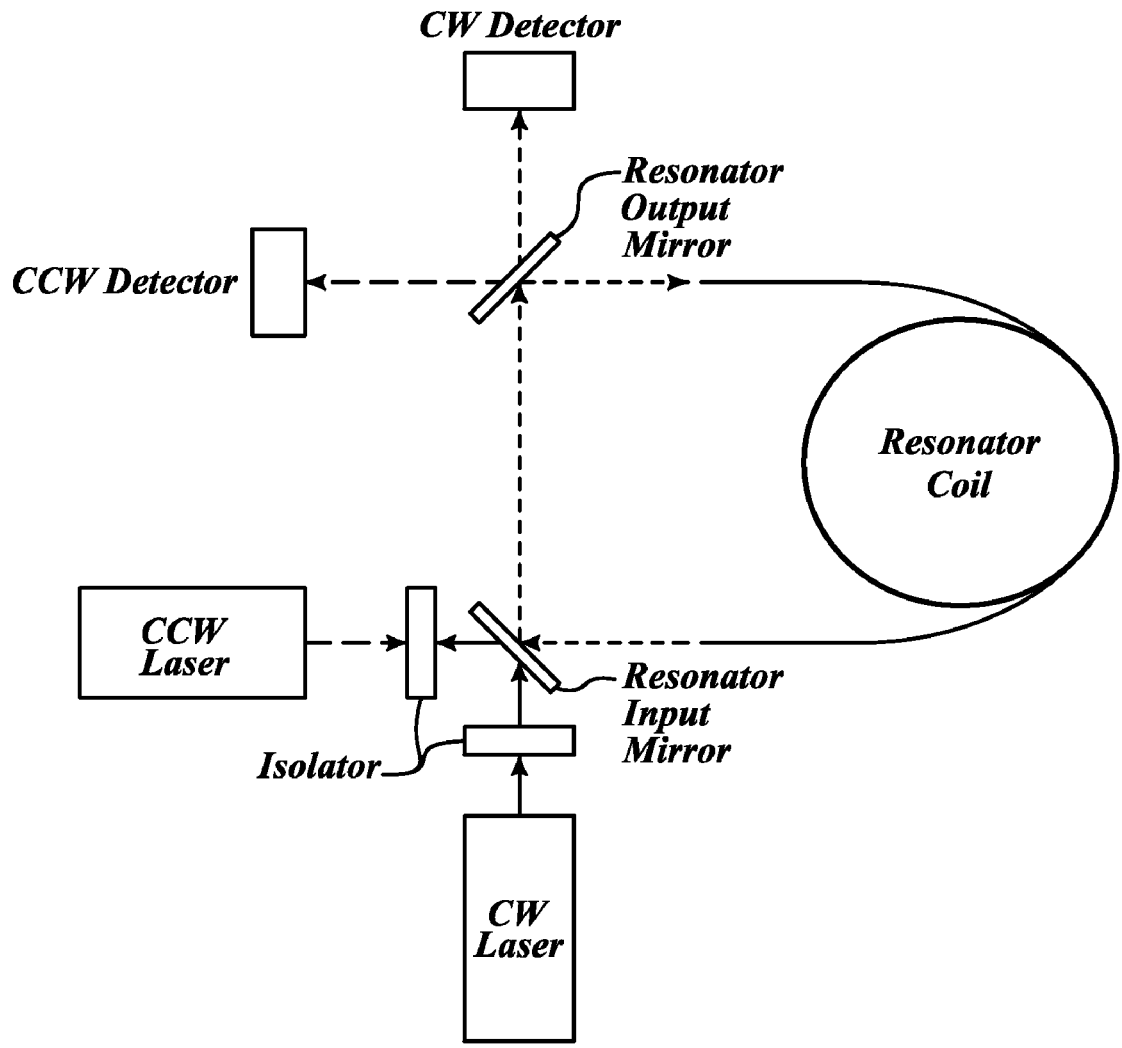
FIG. 2 is a schematic view of a prior art asymmetric two-mirror RFOG in transmission mode.
Figure 3:
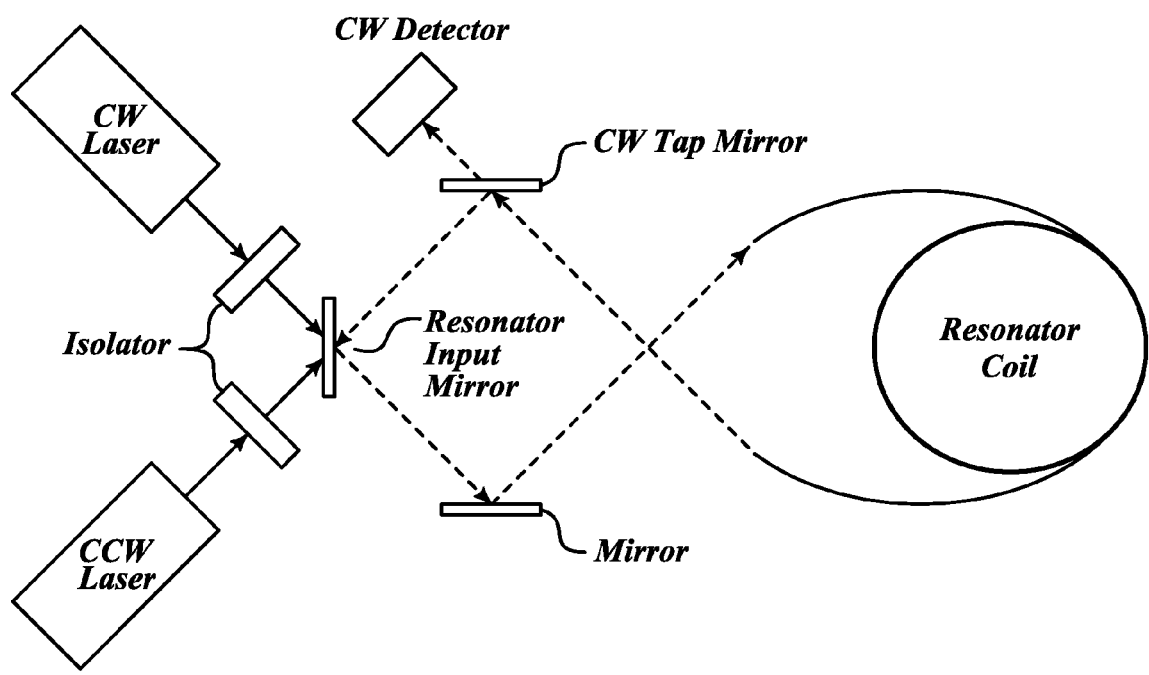
FIG. 3 is a schematic view of a prior art symmetric three-mirror RFOG.
Figure 4:
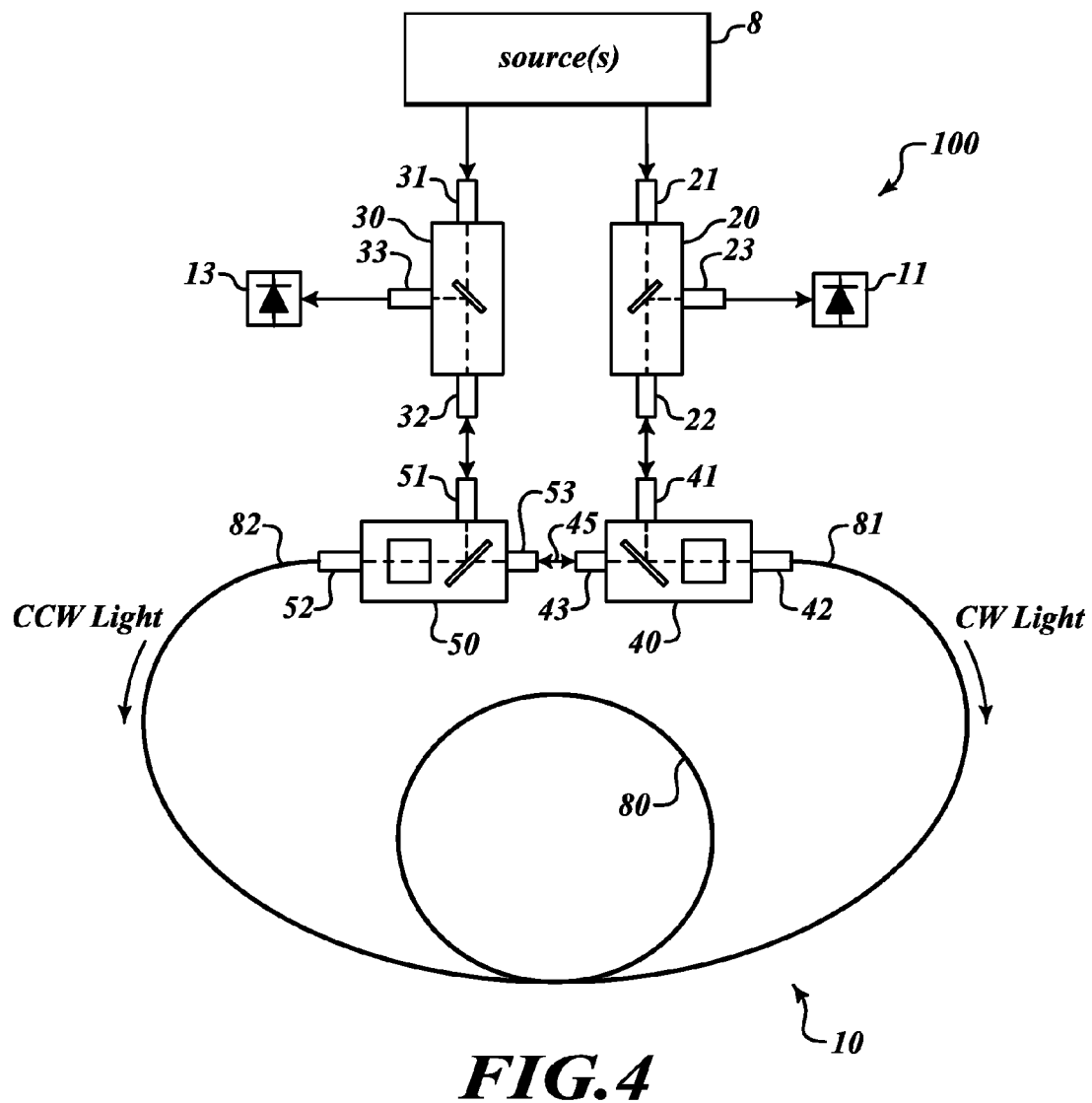
FIG. 4 is a schematic view of a symmetric RFOG resonator with two directional components and two coupling optical components formed in accordance with an embodiment of the present invention.

FIG. 4 shows a resonator fiber optic gyroscope (RFOG) 100 formed in accordance with an exemplary embodiment of the present invention. The RFOG 100 includes light source 8, directional optical components 20 and 30, resonator input/output coupling optical components 40 and 50, detectors 11 and 13, and a resonator 10 including a fiber loop 80. The light source 8 emits at least two beams of light: a beam of light for a CCW direction and another beam of light for the CW direction. Alternatively, light source 8 could include two independent light sources one providing light for the CCW direction and the other for the CW direction. Each of the directional optical components 20 and 30 includes an input port 21 and 31, an output port 22 and 32, and a detector port 23 and 33. A substantial portion of light received by the input port 21 and 31 is directed to the output port 22 and 32 but prevented from entering the detector port 23 and 33. In a reverse direction (indicated by an up-arrow below the output port 22 and 32), a substantial portion of light inputted into the directional optical component 20 and 30 at the output port 22 and 32 is directed to the detector port 23 and 33, which directs light to the detector 11 and 13.

The directional optical components 20 and 30 may include, but are not limited to, a fiber optic circulator, a fiber coupler, a beam splitter, or any optical components that provide desired functions described above. The ports 21, 22, 23, 31, 32, 33 of directional optical components 20 and 30 could be connected to optical fibers or to free space optical beams. Most, if not all, of the foregoing directional optical components are commercially available.

The coupling optical component 40 and 50 includes an in/out port 41 and 51, a loop port 42 and 52, and a relay port 43 and 53. A portion of light directed into the in/out port 41 and 51 is received by the loop port 42 and 52 but does not enter the relay port 43 and 53. A substantial portion (typically 80~99%) of light directed into the coupling optical component 40 and 50 at the relay port 43 and 53 is directed to the loop port 42 and 52 but does not enter in/out port 41 and 51. In the reverse direction, a substantial portion (typically 80~99%) of light directed into the coupling optical component 40 and 50 at the loop port 42 and 52 is received by the relay port 43 and 53, and a portion (typically 1~20%) of it is directed to the in/out port 41 and 51.

The coupling optical components 40 and/or 50 may include, but are not limited to, a fiber coupler, a fiber splitter, a beam splitter, a waveguide device, and/or a combination of the above. The coupling optical component 40 and/or 50 may also include optical components such as polarizers. Most, if not all, of the foregoing coupling optical components are commercially available.

The fiber loop 80 includes ends 81 and 82. The first end 81 is connected to the loop port 42 of the coupling optical component 40, and the second end 82 is connected to the loop port 52 of the coupling optical component 50. The ports 43 and 53 are connected by a connector 45 such as, but not limited to, a piece of fiber, a waveguide or simply a free space optical path for light beam propagation.

To direct light into the resonator 10 in the CW direction, light is directed from the source 8 into the input port 21 of the directional optical component 20. At least a portion of the light passes through the directional optical component 20 and the output port 22 to the in/out port 41 of the coupling optical component 40. The directional optical component 40 directs at least a portion of light through the loop port 42 and into the fiber loop 80. The light circulates in the resonator 10 by transit through the loop port 52, the relay port 53, the connector 45, the relay port 43 and the loop port 42 in the CW direction.

A portion (typically 1~20%) of the CW circulating light entering the loop port 52 is directed out of the resonator 10 at the in/out port 51 by the coupling optical component 50. This light propagates to the output port 32 of the directional optical component 30. The directional optical component 30 directs the light to the detector port 33. The CW detector 13 receives light from the port 33 for CW resonance detection.

To direct light into the resonator 10 in the CCW direction, light is directed from the source 8 into the input port 31 of the directional optical component 30. The light coming out of the port 32 is directed into the in/out port 51 of the coupling optical component 50. The coupling optical component 50 directs the light from the in/out port 51 of the coupling optical component 50 to the loop port 52 where it is coupled into the fiber loop 80. The light circulates in the resonator 10 by transit through the loop port 42, the relay port 43, the connector 45, the relay port 53 and the loop port 52 in the CCW direction. A portion (typically 1~20%) of this CCW circulating light is directed out of the resonator 10 at the coupling optical component 40. Specifically, a portion of light from the loop port 42 is directed to the in/out port 41 by the coupling optical component 40. This light propagates to the output port 22 of the directional optical component 20 and is directed to the detector port 23. The CCW detector 11 receives light from the port 23 for CCW resonance detection.

The directional optical components 20, 30 and the coupling optical components 40, 50 are substantially similar (i.e. mirror images of each other). Accordingly, the resonator 10 configuration is substantially symmetric in the CW and CCW directions. CW and CCW light travel along the exact same optical path in the resonator 10 (but in the reverse direction). This high level of symmetry and reciprocity of the CW and CCW optical path helps cancel the phase delays and asymmetrical beam paths that could cause bias errors by making them common to light traveling in both CW and CCW, thereby improving the gyro bias stability.

Figure 5:
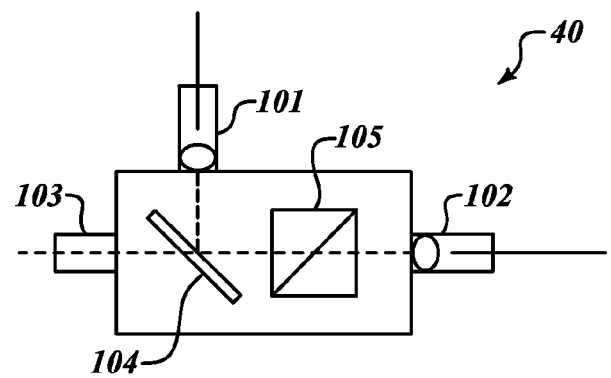
FIG. 5 is a schematic view of an RFOG coupling optical component used in the resonator shown in FIG. 4.

FIG. 5 shows an exemplary implementation of the coupling optical component 40. The coupling optical component 40 includes a beam splitting mirror 104, which reflects a portion (typically 1~20%) of input light from a port 101 to a port 102 and from the port 102 to the port 101. The mirror 104 transmits a portion (typically 80~99%) of light that propagates from a port 103 to a port 102 and from the port 102 to the port 103. A polarizing component 105 may be inserted between the mirror 104 and the port 102 to reduce/remove unwanted polarization modes. In this device, the port 101 and the port 102 may include fiber adaptors. The port 103 may include an optical opening for passing light beams through free space.

Figure 6:
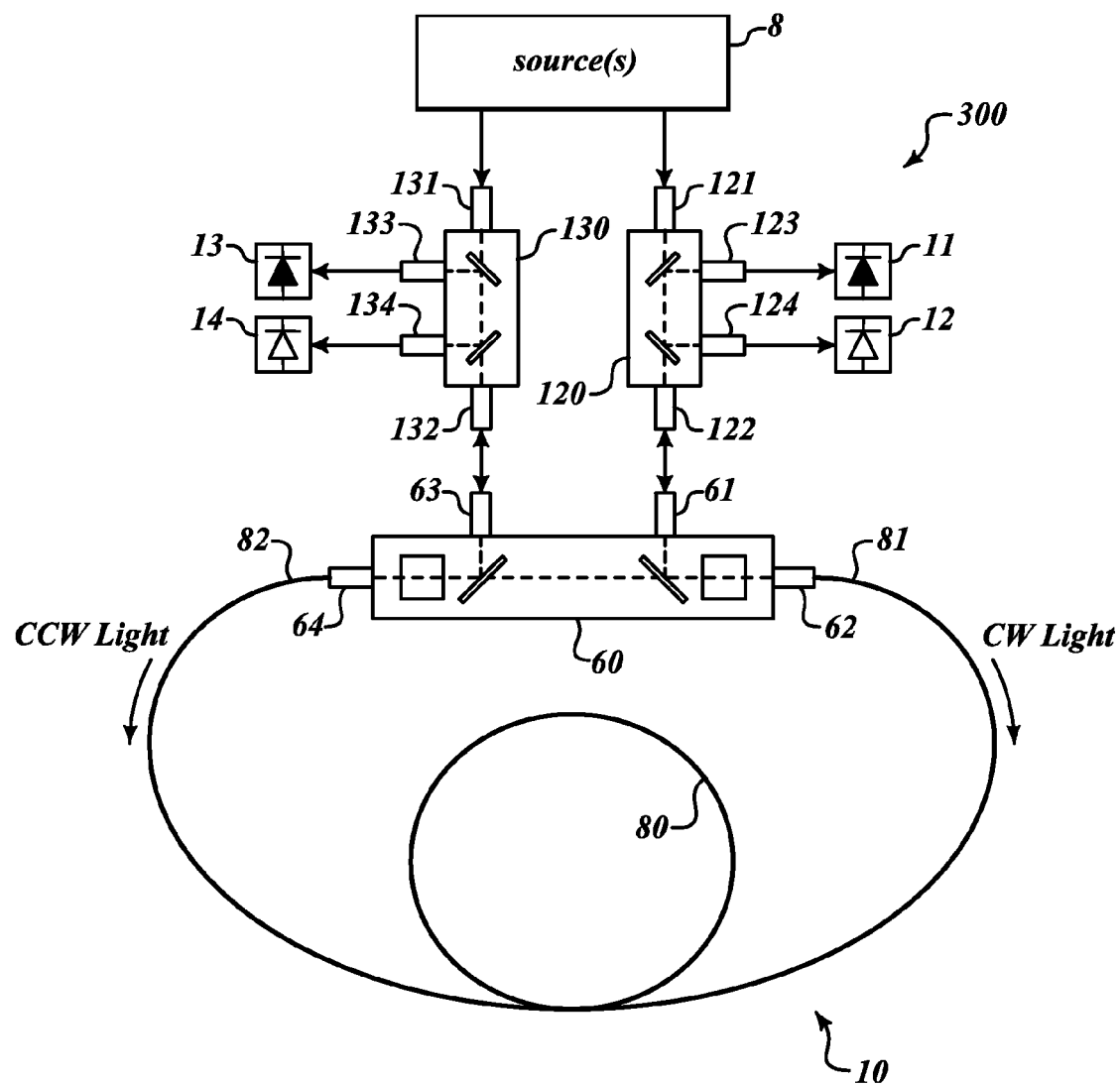
FIG. 6 is a schematic view of a symmetric RFOG resonator including two directional and one coupling optical components formed in accordance with an embodiment of the present invention.

FIG. 6 illustrates an alternate embodiment of an RFOG 300. The RFOG 300 includes relative intensity noise (RIN) detectors 12 and 14, directional optical components 120 and 130 are substantially similar to the directional optical components 20 and 30 but with an additional RIN monitoring port 124 and 134. Ports 121, 131, 122, 132, 123, 133 have substantially the same light directional function as the input port 21 and 31, the output port 22 and 32 and the detector port 23 and 33. In addition to these functions described above, a portion of input light entering the port 121 and 131 is directed to the RIN monitoring port 124 and 134. The RIN detector 12 and 14 receives light from the RIN monitoring port 124 and 134 for measurement of the intensity noise of the input beam. These RIN signals may provide signal feedback to a typical RIN servo electronic system for reduction of the intensity noise or unwanted intensity or amplitude modulation of the input light. Integrating the RIN monitoring port 124 into the directional optical component 120 and 130 reduces the number of total optical components of the gyro. Using fewer optical components reduces packaging constraints. In addition, a cleaner input light beam with less intensity noise is expected because the RIN monitoring point is located proximately to the resonator 10.

A coupling device 60 shown in FIG. 6 is a variation of the coupling optical components 40 and 50. The coupling device 60 combines the functions of the coupling optical components 40 and 50 into one device, thereby making the gyro more compact and easier to package. Generally speaking, the coupling device 60 includes four ports, a CW input port 61, a CCW input port 63, a loop port 62 and another loop port 64. A portion (typically 1~20%) of light directed into the CW input port 61 is directed to the loop port 62 (but prevented from directly entering the loop port 64) and propagates in the CW direction in the fiber loop 80. The CW light exiting the fiber loop 80 at the end 82 is directed into the loop port 64. A substantial portion (typically 80~99%) of the CW light is directed to the loop port 62 and circulated in the resonator 10 in the CW direction. A portion (typically 1~20%) of the CW light circulating inside the resonator 10 is directed out of the resonator 10 by propagating from the loop port 64 to the CCW input port 63. This light is then directed to the CW detector 13 through the detector port 133 of the directional optical component 130 for CW resonance signal detection.

A portion of light (typically 1~20%) directed into the CCW input port 63 is directed to the loop port 64 and propagates in the CCW direction in the fiber loop 80. The CCW light exiting the fiber loop 80 at the end 81 is directed into the loop port 62. A substantial portion (typically 80~99%) of this light is directed to the loop port 64 and circulated in the resonator 10 in the CCW direction. A portion (typically 1~20%) of the CCW light circulating inside the resonator 10 is directed out of the resonator 10 by propagating from the loop port 62 to the CW input port 61. From the CW input port 61, the light is directed to the CCW detector 11 through the detector port 123 of the directional optical component 120 for CCW resonance signal detection.

Figure 7:
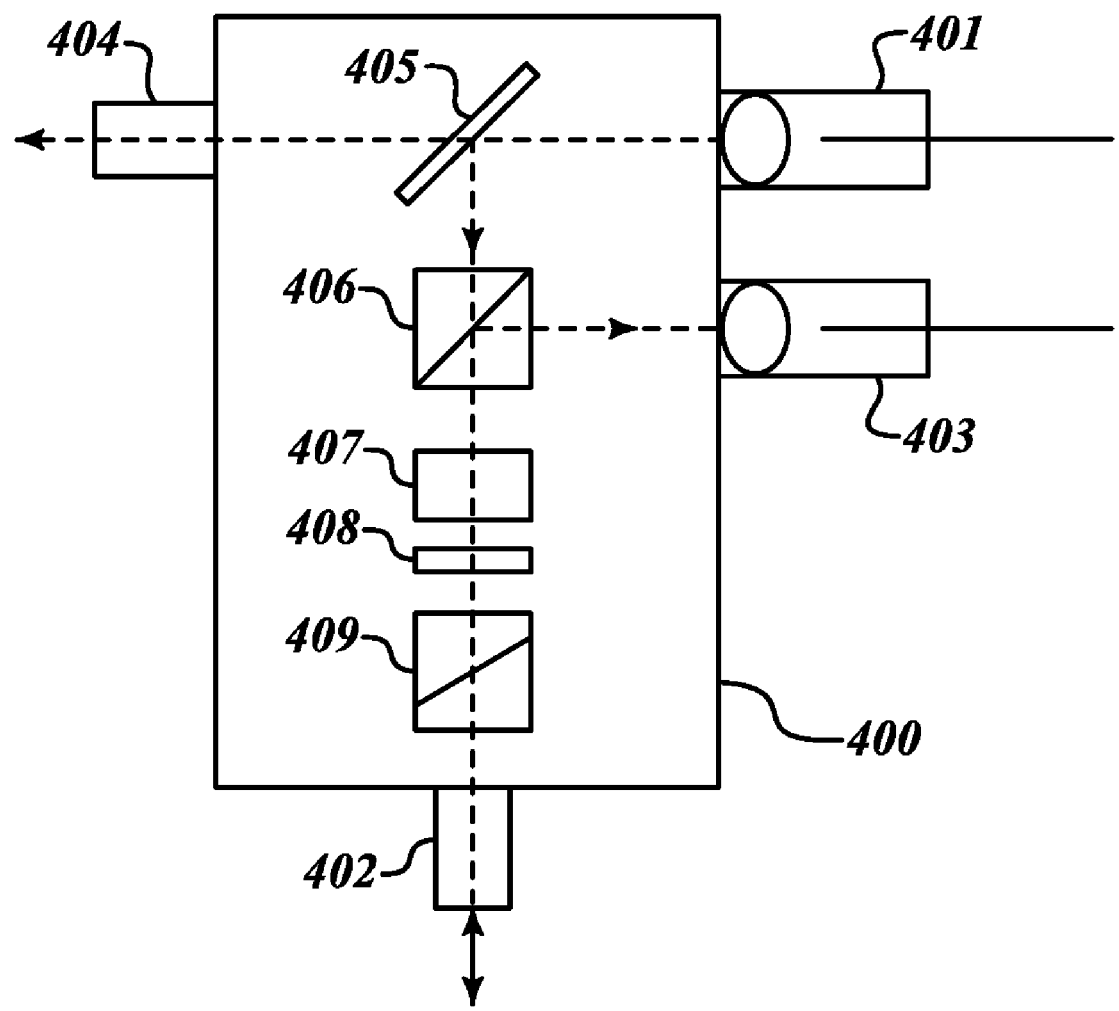
FIG. 7 is a schematic view of an embodiment of an RFOG directional optical component including four ports formed in accordance with an embodiment of the present invention.

FIG. 7 shows an exemplary embodiment of a directional optical component 400 that could be utilized as the directional optical component 120. The directional optical component 400 includes a partially reflecting mirror 405 that transmits a portion of input light from a port 401 to a port 404 for RIN monitoring. A substantial portion of input light (assumed here to be polarized horizontally without lost generality) is reflected by the mirror 405 and passes through a polarization beam splitter 406 which transmits horizontally polarized light but reflects vertically polarized light. A Faraday rotator 407 rotates the input light by 45°. A following half wave plate 408 changes the input light polarization state back to the horizontal plane, allowing it to pass a polarizer 409 whose polarization pass-axis is oriented along horizontally. In the reverse direction, a horizontal polarized light directed into the port 402 passes through the polarizer 409 without significant losses. The half wave plate 408 rotates the polarization state of the beam by 45° with respect to the horizontal plane. The Faraday rotator 407 is a nonreciprocal device which rotates the polarization of the reverse propagating light to the vertical plane. The beam splitter 406 reflects most of the vertically polarized light to a detector port 403. The beam splitter 406, the rotator 407, the plate 408 and the polarizer 409 is an exemplary implementation of a typical circulator device. Other implementations are possible that integrate the mirror 405 (for RIN signal tap) with a circulator (for separating the reverse propagating beam from the input beam) using micro-optic components. The ports 401, 402, 403 and 404 may be either fiber or free space coupled ports.

Figure 8:
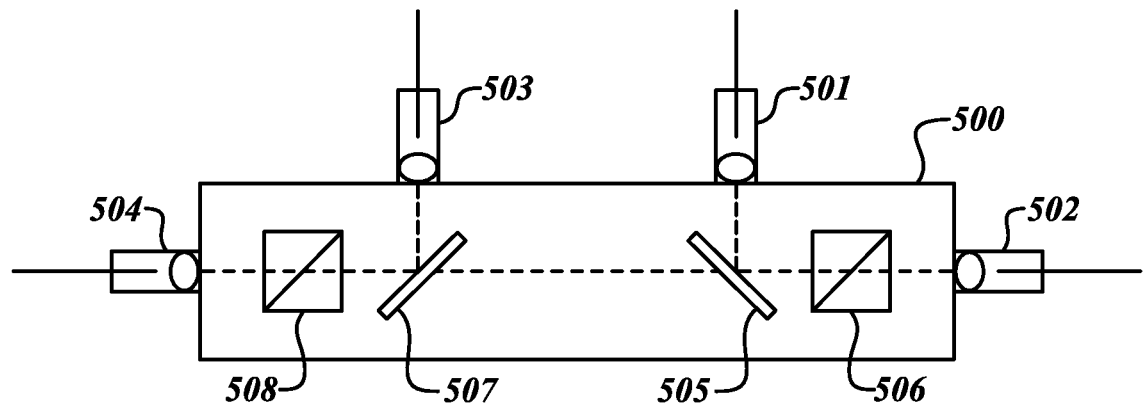
FIG. 8 is a schematic view of an embodiment of an RFOG coupling optical component including four ports in accordance with an embodiment of the present invention.

FIG. 8 shows an exemplary implementation of a coupling device 500 that could be utilized as the coupling device 60 in FIG. 6. The coupling device 500 includes a partial reflecting mirror 505 and 507 that reflects a portion (typically 1~20%) of input light directed at a port 501 and 503 to a port 502 and 504, and reversely, light directed at the port 502 and 504 to the port 501 and 503. The mirrors 505 and 507 transmit a substantial portion (typically 80~99%) of light from the port 502 to the port 504, and reversely, from the port 504 to the port 502. A polarizer 506 and 508 may be inserted between the mirrors 505 and 507 and port 502 and 504 for controlling the polarization state of the light beams. It should be noted that coupling device 500 is an exemplary embodiment that highlights the basic idea of using micro-optic components to implement the functions of the four-port coupling device.

Figure 9:
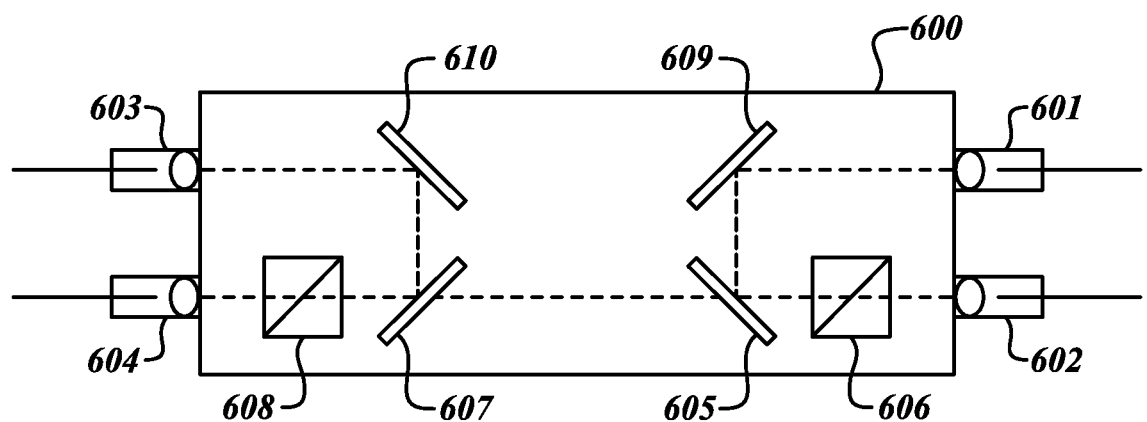
FIG. 9 is a schematic view of an alternative embodiment of an RFOG coupling optical component including four ports.

FIG. 9 illustrates another embodiment of a coupling device 600. In this embodiment, input ports 601 and 603 (analogous to 501 and 503 in FIG. 8) may be arranged on the same side of loop ports 602 and 604 for easier packaging. In addition to partial reflection mirrors 605 and 607, directional mirrors 609 and 610 are also used for directing beams from the input ports 601 and 603 to the loop ports 602 and 604.

Device 500 and 600 are advantageously configured so that the free-space optics can be arranged inline with the light beams recirculating through the coil. By doing so, the alignments of optical components 505, 506, 508, 508 and 605, 606, 607, 608 are less critical. Resonator sensitivity to environment changes due to misalignment of these components can be reduced. Furthermore, those devices along with 502, 504, 602 and 604 can be self aligned using techniques such mounting the fibers in v-grooves on a miniature substrate which can significantly reduce production costs.

Figure 10:
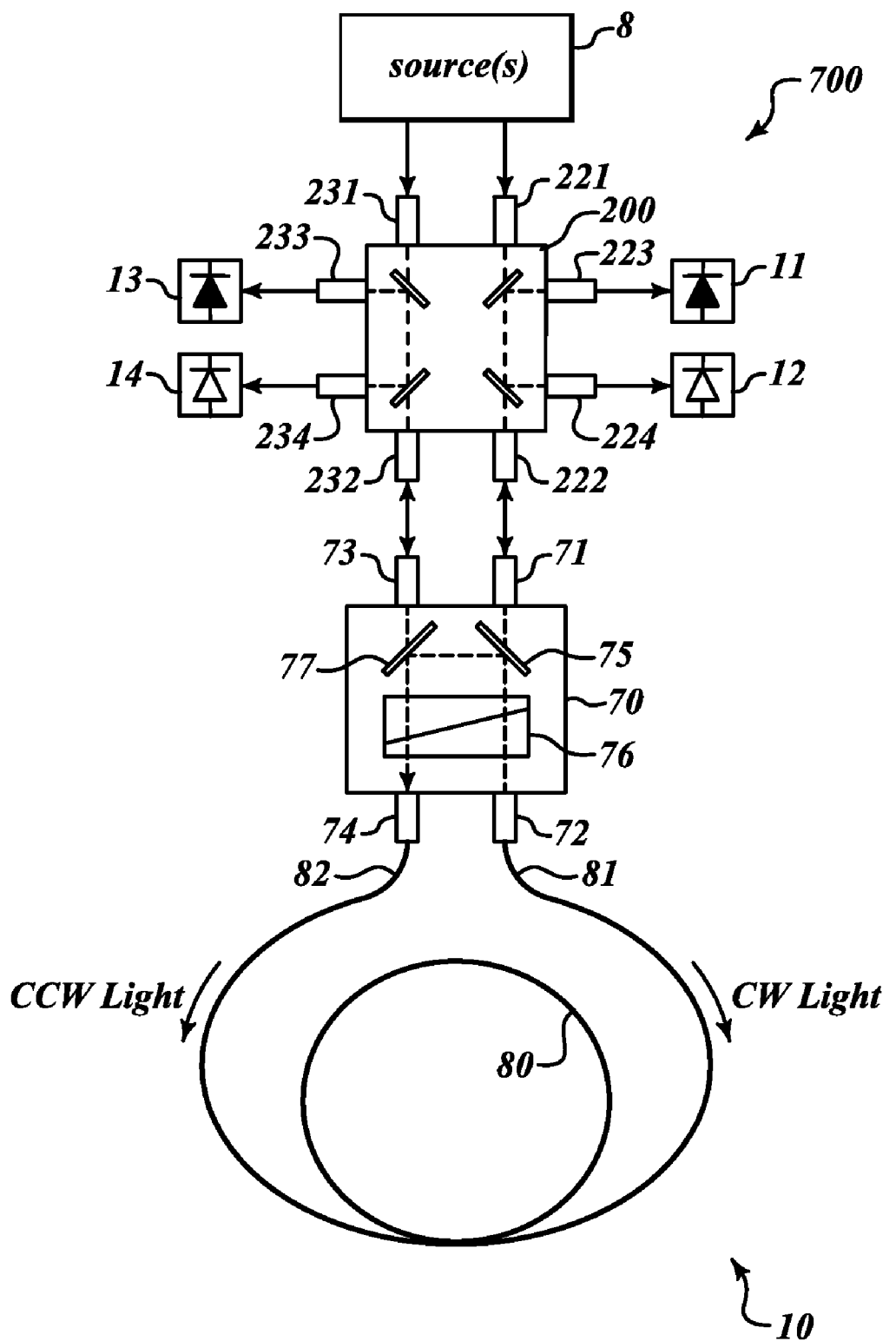
FIG. 10 is a schematic view of a symmetric RFOG resonator including one directional and a coupling optical component in accordance with an embodiment of the present invention.

FIG. 10 shows another RFOG system 700 in accordance with the present invention. The RFOG system 700 includes a directional optical component 200, a coupling optical component 70, and the fiber loop 80. In this embodiment, the directional optical component 200 is an eight-port device that combines the functions of the directional optical components 120, 130 into a single device. Ports 221, 222, 223, 224, 231, 232, 233, and 234 correspond to the ports 121, 122, 123, 124, 131, 132, 133, and 134, respectively. Their directional functions are substantially the same. The major advantages integrating CW and CCW directional optical component includes more compact design, reduced number of components in the package, and increased level of symmetry for CW and CCW propagating beams.

The RFOG system 700 includes a coupling optical component 70 that has substantially the same functions of the coupling device 60. A partial reflecting mirror 75 and 77 transmits a portion of input light directed into a port 71 and 73 to a loop port 72 and 74. A substantial portion (typically 80~99%) of light directed into the loop port 72 and 74 is reflected by the partially reflecting mirror 75 and 77 and 77 and 75 successively and directly to the loop port 74 and 72. A portion (typically 1~20%) of circulating CW (CCW) light is directed out of the resonator 10 by transmitting through the partially reflecting mirror 77 and 75 to the port 73 and 71. A polarizer 76 is shared by both CW and CCW light for polarization control. Sharing components in the coupling optical component 70 is advantageous because a reduced number of components allows lower manufacturing costs and higher degree of resonator 10 symmetry.

The embodiment in FIG. 10 is a variation of the embodiments in FIG. 4 and FIG. 6.

Figure 11:
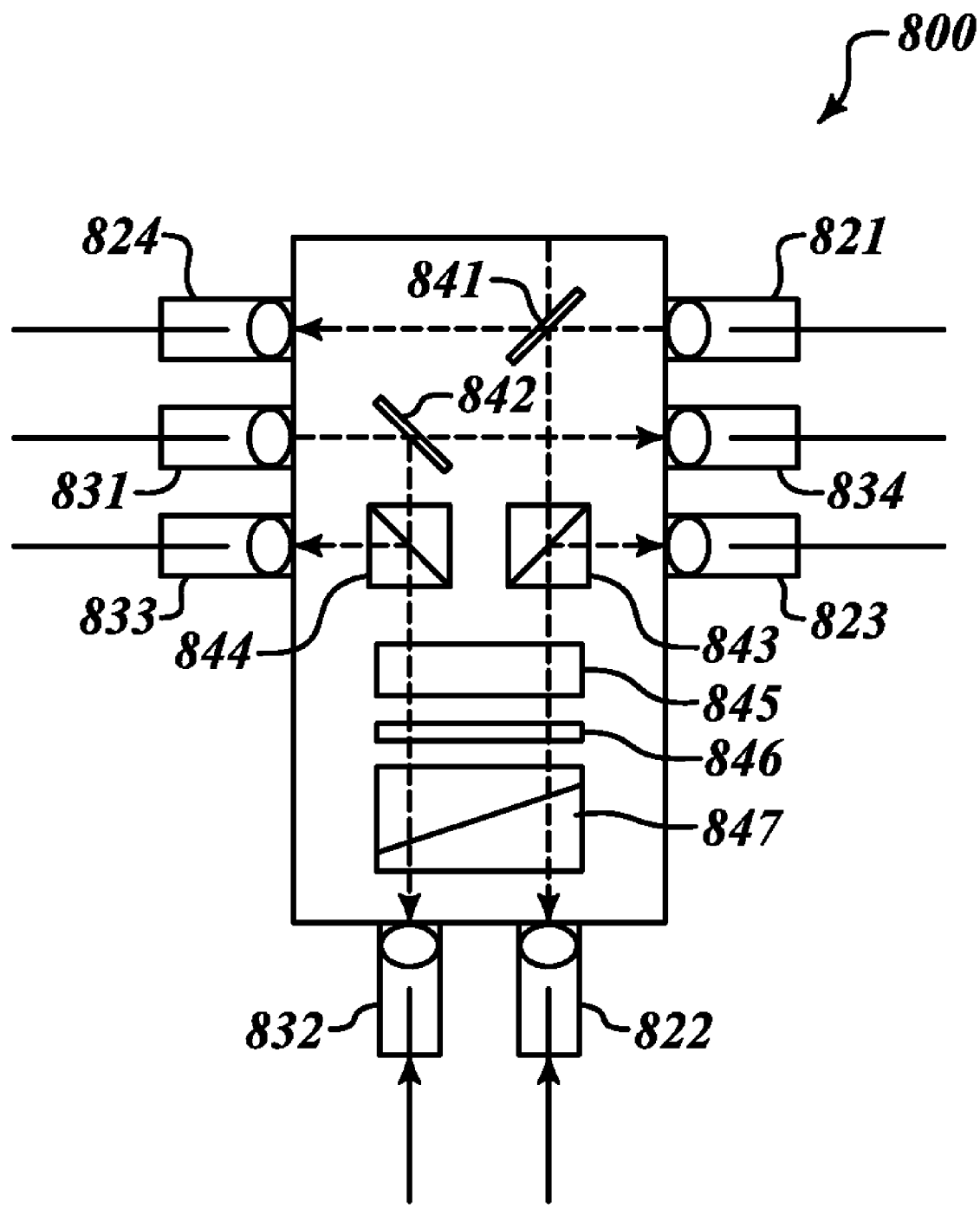
FIG. 11 is a schematic view of an embodiment of an RFOG directional optical component including eight ports.

FIG. 11 illustrates an exemplary eight-port device 800 that could be used as the eight-port device 200. This embodiment shows the possibility of sharing the same optical components for the CW and CCW directional optical component in order to reduce the number of individual components. The eight-port device 800 includes a partial reflecting mirror 841 and 842 that transmits a portion of input light directed into a port 821 and 831 to a RIN monitoring port 824 and 834. A substantial portion of input light (assumed horizontally polarized without lost of generality) is reflected by the partially reflecting mirror 841 and 842 to a polarization beam splitter 843 and 844. The polarization beam splitter 843 and 844 transmits horizontally polarized light but reflects vertically polarized light. A Faraday rotator 845 rotates the input light by approximately 45°. A half wave plate 846 changes the input light polarization state back to the horizontal plane, allowing it to pass a polarizer 847 whose polarization pass-axis is oriented along horizontally. The light is then directed out of a port 822 and 832. Propagation of light in the reverse direction (i.e. from ports 822 and 832 to ports 823 and 833, respectively) has been similarly described above for FIG. 7. It should be noted that the Faraday rotator, the half wave plate and the polarizer 845, 846 and 847 are common to both CW and CCW beams in this design. Reducing components saves space and reduces device cost. Reducing components is also advantageous from the performance point of view because sharing the same optical components for the CW and CCW beam increases the symmetry of the device, leading to more effective cancellation of bias errors.

Figure 12:
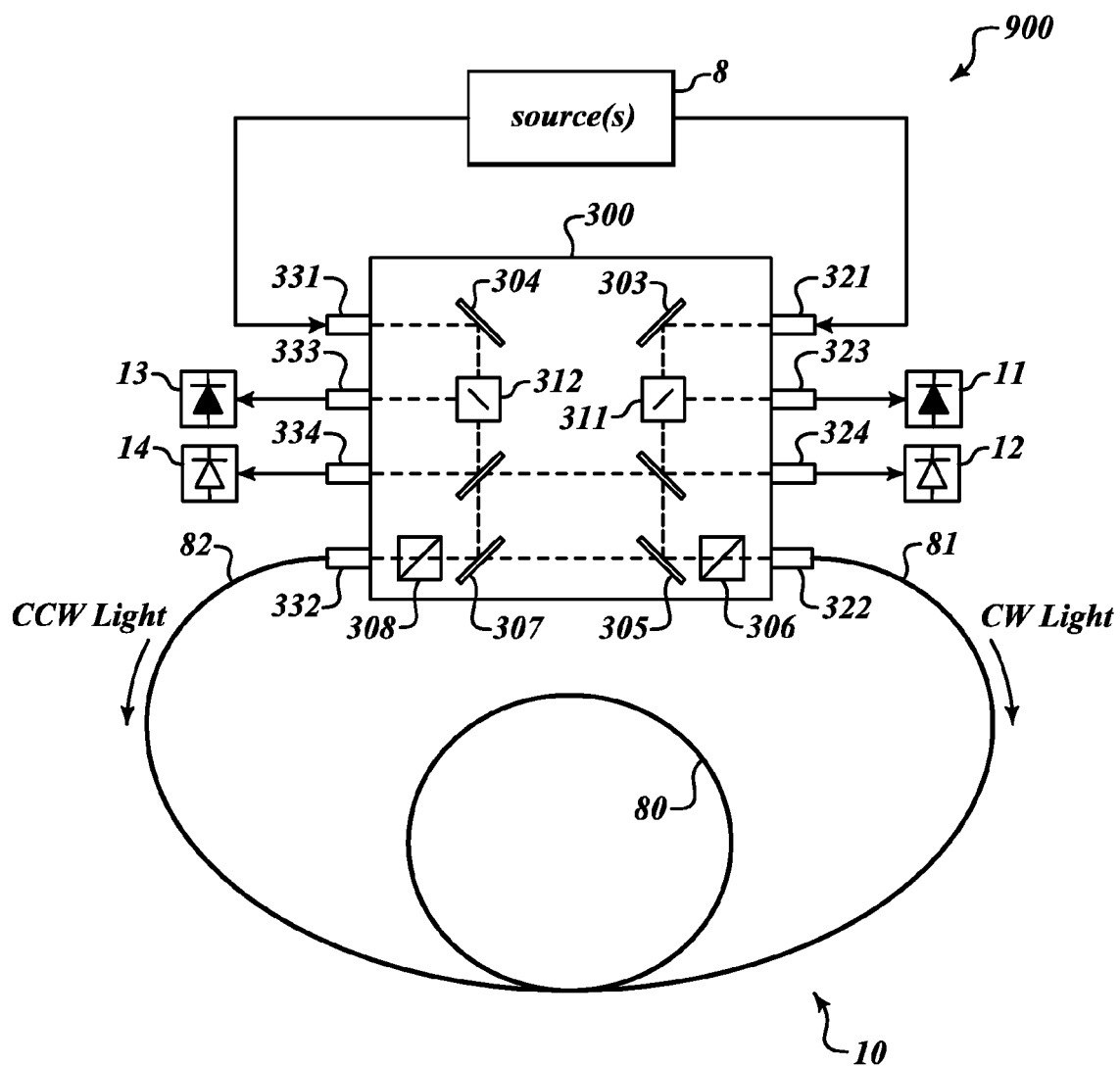
FIG. 12 is a schematic view of a symmetric RFOG resonator with one eight-port optical component in accordance with an embodiment of the present invention.

FIG. 12 is another embodiment of an RFOG system 900 in accordance with the present invention. The RFOG system 900 includes an eight-port optical device 300 that combines the functions of the directional and coupling optical components of the previously mentioned embodiments. More specifically, a substantial portion of the input light directed at port 321 and 331 is directed to loop port 322 and 332 and a portion of the light is directed to a RIN monitoring port 324 and 334. A portion of light circulating in the CW/CCW direction in the fiber loop 80 is directed out of the resonator 10 through polarizing component 308 and 306, beam directing component 307 and 306, and beam splitting device 312 and 311 to a detector port 333 and 323. Beam splitting devices 311 and 312 separate a substantial portion of light directed out of the resonator 10 from light coming into the resonator 10. It is preferable that the beam splitting devices 311 and 312 are implemented to have low loss for both incoming and outgoing beams which may require non-reciprocal polarization rotation device such as Faraday rotators. Polarizing components 306 and 308 are used to reduce the unwanted polarization modes circulating inside the resonator 10. It is preferable to share the optical components with CW and CCW beams because if the system using fewer components reduces costs. Also, sharing optical components leads to a higher degree of symmetry in the RFOG, which improves performance.

The foregoing resonator architectures are symmetric, in transmission mode, and/or use only two coupling devices (e.g. mirrors, partial reflectors or devices that partially transmit and partially reflect light) within the resonator cavity. The resonator is symmetrical because the optical paths of CW and CCW light are substantially identical even though the direction of lightwave propagation is opposite. A symmetrical resonator architecture helps to cancel bias errors that would otherwise erroneously appear as rotation rate and reduce gyro-bias instability. The symmetrical architecture also allows the resonator cavity optics to be in-line with each other, which reduces difficulties in resonator alignment and sensitivity to environmental changes. Furthermore, the symmetrical architecture improves gyro performance and manufacturability and also reduces the number of components, costs and form factor (i.e. size) of the device.

While the preferred embodiment of the invention has been illustrated and described, as noted above, many changes can be made without departing from the spirit and scope of the invention. The corresponding directional and coupling optical components are considered interchangeable between the embodiments to form new embodiments. For example, an embodiment could be proposed using the 8-port directional optical component 200 with the coupling device 60. Another embodiment can be formed using the coupling optical component 70 with the directional optical components 120 and 130. Still another embodiment could utilize the directional optical components 20 and 30 with the coupling device 60 or the coupling optical components 40 and 50 could be used with the directional optical components 120 and 130. Also, two light sources could be utilized, each source emitting at least one beam of light. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A ring resonator sensor comprising:
a first detector and a second detector; and
a ring resonator comprising:
a coil having a first end and a second end; and
a device in optical communication with the coil, the device comprising:
a first component; and
a second component,
wherein the device is configured to receive light from a source and receive light from each end of the coil,
wherein the first component includes a first coupling device configured to direct at least a portion of light received from the source to the first end of the coil so that light propagates through the coil in a first direction,
wherein the second component includes a second coupling device configured to direct at least a portion of light received from the source to the second end of the coil so that light propagates through the coil in a second direction,
wherein the first coupling device is configured to transmit at least a portion of light received from the first end of the coil to the second coupling device, transmit at least a portion of light received from the second coupling device to the first end of the coil, and reflect at least a portion of light received from the first end of the coil to the first detector,
wherein the second coupling device is configured to transmit at least a portion of light received from the second end of the coil to the first coupling device, transmit at least a portion of light received from the first coupling device to the second end of the coil, and reflect at least a portion of light received from the second end of the coil to the second detector.

2. The ring resonator sensor of claim 1, wherein the device further comprises a third component and a fourth component, the third component configured to direct light received from the first component to the first detector, direct light from the source to the first component, and prevent light received from the source from entering the first detector, the fourth component configured to direct light received from the second component to the second detector, direct light from the source to the second component, and prevent light received from the source from entering the second detector.

3. The ring resonator sensor of claim 2, wherein the third component is further configured to direct at least a portion of the light from the source to a first relative intensity noise (RIN) monitoring component, wherein the fourth component is further configured to direct at least a portion of the light from the source to a second relative intensity noise (RIN) monitoring component.

4. The ring resonator sensor of claim 3, wherein the third component and the fourth component each comprise a directional coupling device.

5. The ring resonator sensor of claim 2, wherein the device further comprising at least one polarizing component.

6. The ring resonator of claim 5, wherein the polarizing component is configured to polarize light received from the third component, the first end of the coil, and the second end of the coil.

7. The ring resonator of claim 6, wherein the device further comprising a second polarizing component, wherein the second polarizing component is configured to polarize light received from the fourth component, the first end of the coil, and the second end of the coil.

8. The ring resonator sensor of claim 5, wherein a single polarizing component is configured to polarize light received from the third component, the fourth component, the first end of the coil, and the second end of the coil.

9. The ring resonator sensor of claim 6, wherein the device and the coil are configured so that all light directed to the first detector or the second detector has been passed through at least one polarizer and the coil.

10. The ring resonator sensor of claim 2,
wherein the device further comprises a first pathway configured to facilitate optical communication in both directions between the first component and the third component,
wherein the device further comprises a second pathway configured to facilitate optical communication in both directions between the second component and the fourth component,
wherein the device further comprises a third pathway configured to facilitate optical communication in both directions between the first component and the second component.

11. The ring resonator sensor of claim 2, wherein the device and the coil are configured such that light propagating in the first direction and the light propagating in the second direction travel in substantially symmetrical paths.

12. The ring resonator sensor of claim 1, wherein the first coupling device comprises a first partially reflective mirror and wherein the second coupling device comprises a second partially reflective mirror.

13. The ring resonator sensor of claim 12, wherein the first component includes a third partially reflective mirror and the second component includes a fourth partially reflective mirror.

14. The ring resonator sensor of claim 2, wherein the first component, the second component, the third component, and the fourth component are integrated into a single micro-optic device.

15. The ring resonator sensor of claim 2, wherein the first component and the second component are integrated into a single micro-optic device.

16. The ring resonator sensor of claim 14, wherein the single micro-optic device comprises not more than four ports.

17. A ring resonator sensor comprising:
a light source;
a first detector and a second detector;
a coil comprising a first end and a second end;
means for directing at least a portion of light from the source to the first end of the coil so that it propagates in the coil in a first direction, directing at least a portion of light from the source to the second end of the coil so that it propagates in the coil in the second direction, transmitting a portion of the light from the first end of the coil to the second end of the coil, transmitting a portion of light from the second end of the coil to the first end of the coil, reflecting a portion of the light from the first end of the coil to the first detector, and reflecting a portion of the light from the second end of the coil to the second detector.

18. The means of claim 17, further comprising means for polarizing the light between the light source and the coil.

19. The means of claim 17, further comprising means for detecting the characteristics of the light from the light source prior to the light entering the coil.

* * * * *